(12) United States Patent
Isshiki et al.

(10) Patent No.: US 11,451,388 B2
(45) Date of Patent: Sep. 20, 2022

(54) DATA EXTRACTION SYSTEM, DATA EXTRACTION METHOD, REGISTRATION APPARATUS, AND PROGRAM

(71) Applicant: NEC Corporation, Tokyo (JP)

(72) Inventors: Toshiyuki Isshiki, Tokyo (JP); Haruna Higo, Tokyo (JP); Kengo Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 593 days.

(21) Appl. No.: 16/327,383

(22) PCT Filed: Aug. 29, 2017

(86) PCT No.: PCT/JP2017/030878
§ 371 (c)(1),
(2) Date: Feb. 22, 2019

(87) PCT Pub. No.: WO2018/043466
PCT Pub. Date: Mar. 8, 2018

(65) Prior Publication Data
US 2019/0190702 A1 Jun. 20, 2019

(30) Foreign Application Priority Data
Aug. 30, 2016 (JP) .............................. JP2016-167935

(51) Int. Cl.
*H04L 9/08* (2006.01)
*H04L 9/32* (2006.01)
(Continued)

(52) U.S. Cl.
CPC .............. *H04L 9/088* (2013.01); *G06F 21/32* (2013.01); *G06F 21/6209* (2013.01); *H04L 9/08* (2013.01);
(Continued)

(58) Field of Classification Search
CPC ... H04L 9/088; H04L 9/08; H04L 9/32; H04L 9/3231; G06F 21/32; G06F 21/6209; G06F 2221/2107
See application file for complete search history.

(56) References Cited

U.S. PATENT DOCUMENTS

| 6,038,315 A | 3/2000 | Strait et al. |
| 2003/0219121 A1 | 11/2003 | Van Someren |

(Continued)

FOREIGN PATENT DOCUMENTS

| JP | 2002-027231 A | 1/2002 |
| JP | 2004-135004 A | 4/2004 |

(Continued)

OTHER PUBLICATIONS

International Search Report for PCT Application No. PCT/JP2017/030878, dated Dec. 5, 2017.

*Primary Examiner* — Hee K Song

(57) ABSTRACT

A data extraction system includes a registration apparatus, a data storage apparatus, and a query apparatus. The registration apparatus generates registration data including first information obtained by encrypting secret information, which is information that a user wishes to keep secret, by using a secret key and second information obtained by encrypting the secret key by using at least biological information of the user. The data storage apparatus holds the registration data. The query apparatus acquires the registration data by generating a query for acquiring the registration data from the data storage apparatus, extracts the secret key from the registration data by using biological information of the user, and extracts the secret information from the registration data by using the extracted secret key.

7 Claims, 11 Drawing Sheets

(51) Int. Cl.
 *G06F 21/62* (2013.01)
 *G06F 21/32* (2013.01)

(52) U.S. Cl.
 CPC .............. *H04L 9/32* (2013.01); *H04L 9/3231* (2013.01); *H04L 9/3236* (2013.01); *G06F 2221/2107* (2013.01)

(56) References Cited

U.S. PATENT DOCUMENTS

2004/0139315 A1 7/2004 Tokutani et al.
2006/0190742 A1 8/2006 Ebitani et al.

FOREIGN PATENT DOCUMENTS

| | | |
|---|---|---|
| JP | 2006-158851 A | 6/2006 |
| JP | 2006-260521 A | 9/2006 |
| JP | 2015-032108 A | 2/2015 |
| WO | 2015/045512 A1 | 4/2015 |
| WO | WO-2015045512 A1 * | 4/2015 ........... H04L 9/0822 |

* cited by examiner

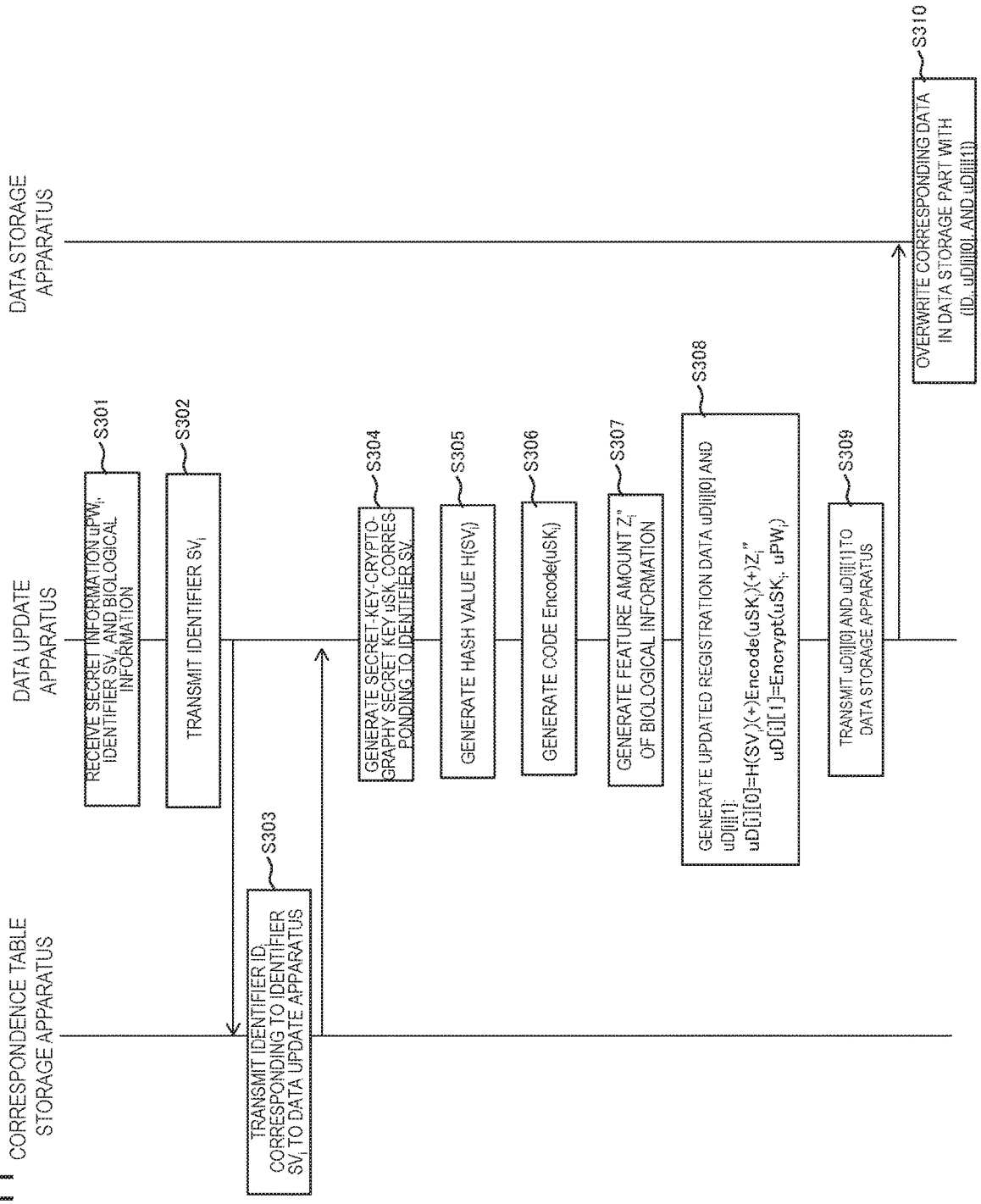

DATA EXTRACTION SYSTEM, DATA EXTRACTION METHOD, REGISTRATION APPARATUS, AND PROGRAM

TECHNICAL FIELD

Reference to Related Application

The present invention is based upon and claims the benefit of the priority of Japanese patent application No. 2016-167935, filed on Aug. 30, 2016, the disclosure of which is incorporated herein in its entirety by reference thereto. The present invention relates to a data extraction system, a data extraction method, a registration apparatus, and a program. In particular, it relates to a data extraction system, a data extraction method, a registration apparatus, and a program for accessing data stored in a storage on a network.

BACKGROUND

In recent years, various services have been provided to users via networks. When a user uses a service on a network, whether the user has the authority to use the service needs to be checked or the user to be charged needs to be determined. In such an operation, authentication using a password is widely used. This authentication using a password is an authentication method in which whether a user holds a predetermined character string (a secret word or secret information) is determined.

In addition, in recent years, network environments have been improved, and many services have been provided on the Internet. Thus, a single user often uses many services. In view of protection of information and security, it is desirable that a different password should be used for an individual service. However, in practice, since it is difficult for a single user to hold and manage many passwords, for example, the user uses the same password for many services. This could cause a problem.

To solve this problem, in recent years, a password manager, which is a system for managing passwords, has attracted attention. The password manager is a system in which, when a user uses a service, the user can search for a password for the service, by previously storing a combination(s) of a service(s) and a password(s) for the service(s) in a terminal used by the user. With this password manager, since the user can obtain a password from the name of the service, the user does not need to hold and manage many passwords by himself/herself. In addition, since passwords are stored inside the terminal used by the user, as long as the terminal is correctly managed (properly protected), there is no chance that the passwords will be leaked.

However, along with rapid spread of smartphones, etc., an individual user more often uses different terminals to use a single service. For example, it is often the case that, when a user uses a service, the user uses a personal computer (PC) at home and uses a smartphone outside. In this case, to use the above password manager, the user needs to prepare the password manager both in the PC and the smartphone. Namely, since the password for the service is already set, the same password needs to be stored (entered) in the plurality of devices. In addition, as in the case with smartphones, some terminals are changed relatively frequently. Namely, each time a terminal including the password manager is changed, the user needs to move data to the new terminal. This is problematic in terms of the convenience.

To address this problem, a password manager service using a cloud service is being used. This service enables an individual user to access a single password manager from various terminals used by the user, by storing information (a combination(s) of a service(s) and a password(s)), which is originally stored in the terminals of the user, on a cloud. When a user uses the password manager service, first, to access the password manager, the user performs user authentication by using a password or the like. If the user is authenticated, the user acquires a password for a service stored by himself/herself and uses the service.

As described above, in the case of the password manager service using a cloud service, user authentication is needed. Thus, the user needs to hold and manage a single password for the authentication by the password manager service. In other words, as long as the user holds and manages a single password, the user does not need to hold and manage many passwords for various services. In addition, if physical characteristics (a biological organ) or behavioral characteristics (a habit) of a user are used for the user authentication, the user does not need to hold and manage any passwords. The user authentication using physical characteristics or behavioral characteristics of a user is referred to as biometric authentication.

PTL 1 discloses a cloud service in which user authentication is performed by using biological information (paragraph [0067]). PTL 1 discloses checking authentication data received by an authentication server against registered authentication data in the cloud service in FIG. 1 of PTL 1.

[PTL 1]

Japanese Patent Kokai Publication No. JP2015-32108A

SUMMARY

The disclosure of the above PTL 1 is incorporated herein by reference thereto. The following analysis has been made by the present inventors.

While the above cloud-based password manager service provides high convenience to users, if a combination(s) of a service(s) and a password(s) is stored on a cloud, it is necessary to prevent leakage of the data. In anticipation of data leakage, the data could be encrypted in advance and stored on a cloud. However, in this case, the corresponding server on the cloud and the user himself/herself need to hold the encryption decoding key. When the decoding key is stored on the cloud, if a manager or the like of the cloud has a malicious intention or if a third party takes over the cloud server by hacking or the like, the security cannot be ensured. In addition, if the user himself/herself holds the decoding key, since the user needs to hold and manage the additional secret information, the convenience is deteriorated.

As described above, in a data extraction system such as a password manager service provided on a cloud, the secret information (the encryption decoding key) needs to be kept secret from the cloud manager, and the information (the above decoding key and password) that needs to be managed by the user needs to be reduced. Namely, in a secret information storage service on a cloud including a password manager, the secret information needs to be kept secret from the manager, and the convenience needs to be improved by reducing the information managed by the user.

PTL 1 discloses a technique for user authentication based on biological information of a user when the user uses a cloud service. In this case, since the biological information, which is personal information of the user, needs to be provided to a cloud, some users may express concern about providing the information. Namely, the cloud side needs to keep the biological information (the personal information) of the user secret, in addition to the above secret information.

It is an object of the present invention to provide a data extraction system, a data extraction method, a registration apparatus, and a program that ensure high security for personal information and secret information and that do not deteriorate the user convenience.

According to a first aspect of the present invention, there is provided a data extraction system, including: a registration apparatus configured to generate registration data including first information obtained by encrypting secret information, which is information that a user wishes to keep secret, by using a secret key and second information obtained by encrypting the secret key by using at least biological information of the user; a data storage apparatus configured to hold the registration data; and a query apparatus configured to acquire the registration data by generating a query for acquiring the registration data from the data storage apparatus, extract the secret key from the registration data by using biological information of the user, and extract the secret information from the registration data by using the extracted secret key.

According to a second aspect of the present invention, there is provided a data extraction method, including: generating registration data including first information obtained by encrypting secret information, which is information that a user wishes to keep secret, by using a secret key and second information obtained by encrypting the secret key by using at least biological information of the user; storing the registration data in a data storage apparatus; acquiring the registration data by generating a query for acquiring the registration data from the data storage apparatus; extracting the secret key from the registration data by using biological information of the user; and extracting the secret information from the registration data by using the extracted secret key.

According to a third aspect of the present invention, there is provided a registration apparatus, including: a secret key generation part configured to generate a secret key for encrypting secret information, which is information that a user wishes to keep secret; and a registration data generation part configured to generate registration data including first information obtained by encrypting the secret information by using the secret key and second information obtained by encrypting the secret key by using at least biological information of the user.

According to a fourth aspect of the present invention, there is provided a program, causing a computer to perform processing for: generating a secret key for encrypting secret information, which is information that a user wishes to keep secret; and generating registration data including first information obtained by encrypting the secret information by using the secret key and second information obtained by encrypting the secret key by using at least biological information of the user.

This program can be stored in a computer-readable storage medium. The storage medium may be a non-transient storage medium such as a semiconductor memory, a hard disk, a magnetic storage medium, or an optical storage medium. The present invention can be embodied as a computer program product.

According to an individual aspect of the present invention, there are provided a data extraction system, a data extraction method, a registration apparatus, and a program that ensure high security for personal information and secret information and that do not deteriorate the user convenience.

BRIEF DESCRIPTION OF THE DRAWINGS

FIG. 11 is a sequence diagram illustrating an example of an operation in an update phase in the data extraction system according to the first exemplary embodiment.

PREFERRED MODES

Figure 1:
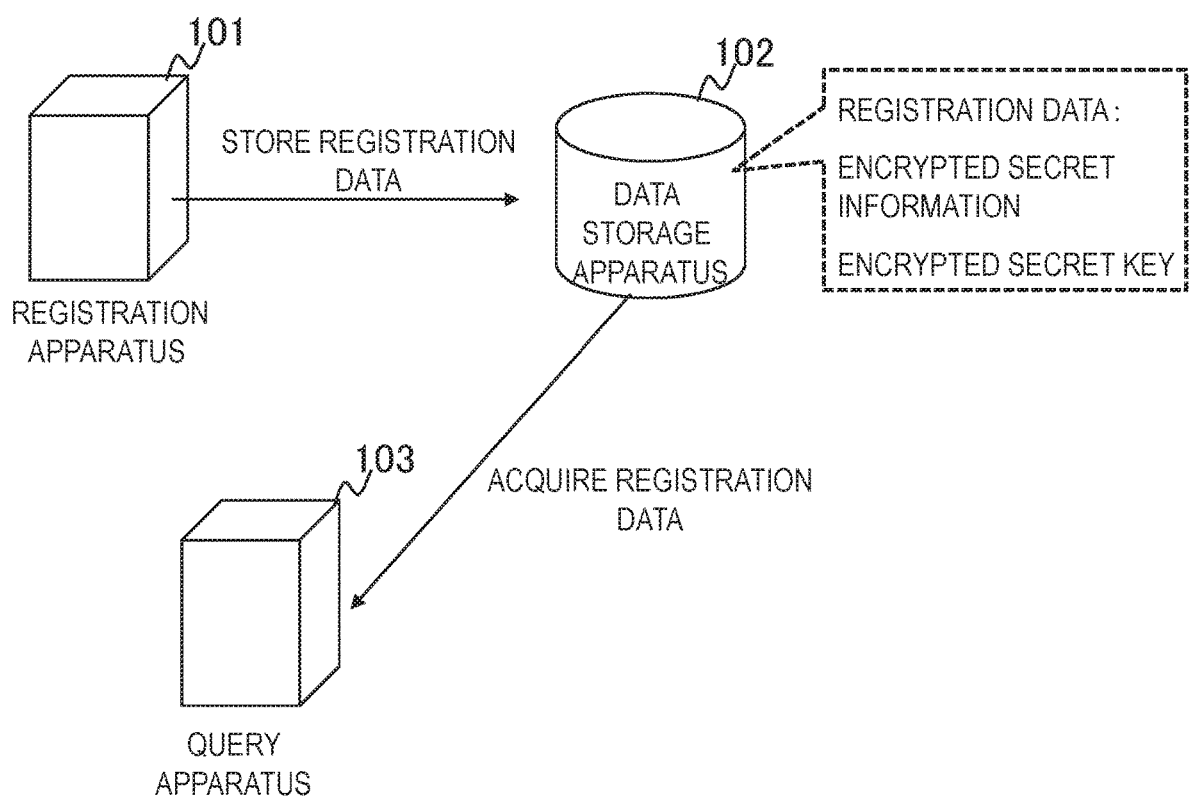
FIG. 1 illustrates an outline of an exemplary embodiment.

First, an outline of an exemplary embodiment will be described. In the following outline, various elements are denoted by reference characters for the sake of convenience. Namely, the following reference characters are merely used as examples to facilitate understanding of the present invention, and the description of the outline is not intended to impose any limitations.

A data extraction system according to an exemplary embodiment includes a registration apparatus 101, a data storage apparatus 102, and a query apparatus 103 (see FIG. 1). The registration apparatus 101 generates registration data including first information obtained by encrypting secret information, which is information that a user wishes to keep secret, by using a secret key and second information obtained by encrypting the secret key by using at least biological information of the user. The data storage apparatus 102 holds the registration data. The query apparatus 103 acquires the registration data by generating a query for acquiring the registration data from the data storage apparatus 102, extracts the secret key from the registration data by using biological information of the user, and extracts the secret information from the registration data by using the extracted secret key.

In the data extraction system according to the above exemplary embodiment, the registration apparatus 101 keeps information (data), which a user wishes to keep secret, secret by using a key K and keeps this key K secret by using biological information of the user who uses the system. These items of information (the secret data and the secret key K) are stored in a server (the data storage apparatus 102) on a cloud. When the data is extracted, the key K is restored by biological information of the user, and the data is extracted by the restored key K. As a result, for example, when a secret information storage service (for example, a password manager service) on a cloud is used, the authentication for using a service and the data protection by using biological information can be achieved. In addition, it is possible to keep the data secret from the cloud manage and reduce the management burden on the information needed when the user uses the service. Namely, there is provided a data extraction system that ensures high security for personal information (biological information) and secret information (a password, etc.) and that does not deteriorate the user convenience.

Hereinafter, a specific exemplary embodiment will be described in more detail with reference to the drawings. In the exemplary embodiment, like reference characters refer to like components, and description thereof will be omitted.

First Exemplary Embodiment

A first exemplary embodiment will be described in more detail with reference to the drawings.

Figure 2:
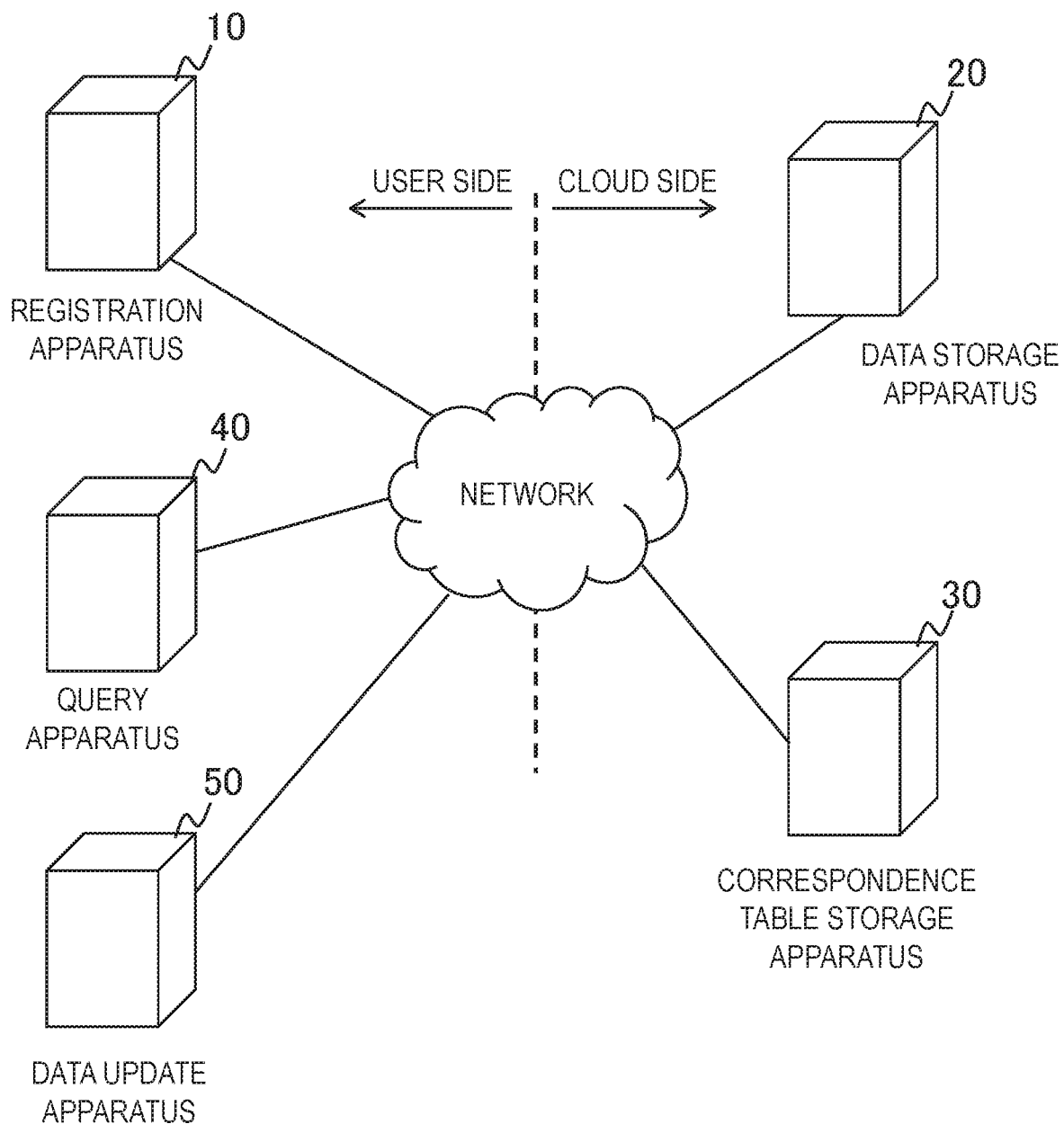
FIG. 2 illustrates an example of a schematic configuration of a data extraction system (a secret information extraction system) according to a first exemplary embodiment.

FIG. 2 illustrates an example of a schematic configuration of a data extraction system (a secret information extraction system) according to the first exemplary embodiment.

As illustrated in FIG. 2, the data extraction system includes a registration apparatus 10, a data storage apparatus 20, a correspondence table storage apparatus 30, a query apparatus 40, and a data update apparatus 50. These apparatuses such as the registration apparatus 10 are connected to each other via a network.

[Description of Schematic Operation]

In the data extraction system illustrated in FIG. 2, first, a user enters information that the user wishes to keep secret (for example, a combination of a password and a service) to the registration apparatus 10. In this operation, the user enters the information that the user wishes to keep secret (this information will hereinafter be referred to as secret information), an identifier (ID) for identifying this information, and biological information of the user (for example, a fingerprint image or the like) to the registration apparatus 10. After encrypting the entered secret information, the registration apparatus 10 stores the secret information in the data storage apparatus 20.

The user performs acquisition of the secret information stored in the data storage apparatus 20 by using the query apparatus 40. Namely, the user acquires the secret information registered in the data storage apparatus 20 via the query apparatus 40. When acquiring the secret information, the user enters an identifier corresponding to the secret information that the user wishes to acquire and the same kind of biological information as the biological information, which has previously been entered to the registration apparatus 10, to the query apparatus 40.

When the user updates the secret information stored in the data storage apparatus 20, the user enters updated secret information, an identifier, and biological information to the data update apparatus 50. The data update apparatus 50 generates data for updating the corresponding data stored in the data storage apparatus 20 and requests the data storage apparatus 20 to rewrite the corresponding data stored.

In FIG. 2, the registration apparatus 10, the query apparatus 40, and the data update apparatus 50 are user-side apparatuses, and the data storage apparatus 20 and the correspondence table storage apparatus 30 are cloud-side apparatuses. For example, the user stores a combination of a password and a service as the secret information in the data storage apparatus 20 by using the registration apparatus 10 (the secret information on the cloud side). There are cases in which the user uses the secret information stored in the data storage apparatus 20 with a different terminal. Thus, such terminal needs to have the same functions as those of the query apparatus 40. In this case, the user acquires the secret information from the cloud by entering the identifier corresponding to the secret information that the user wishes to extract and his/her own biological information to the terminal (the secret information is decoded on the user side). The functions of the registration apparatus 10, the query apparatus 40, and the data update apparatus 50 may of course be realized by a single terminal (a smartphone or a personal computer).

The operation of the above data extraction system can be classified into three phases of "registration phase", "query phase", and "update phase".

In the registration phase, the registration apparatus 10 generates registration data in which the secret information determined by the user is kept secret and stores the registration data in the data storage apparatus 20. In this phase, the data storage apparatus 20 adds a corresponding identifier to the registration data. In the following description, an identifier added to registration data will be referred to as a registration data identifier. In addition, an identifier that a user adds to secret information will be referred to as a secret information identifier. The correspondence table storage apparatus 30 holds a correspondence relationship between a secret information identifier added by a user to secret information and a registration data identifier.

In the query phase, the query apparatus 40 acquires registration data from the data storage apparatus 20 by using a secret information identifier corresponding to the secret information that a user wishes to extract and extracts the secret information from the registration data. The extracted secret information is provided to the user.

In the update phase, registration data is updated when registered secret information is changed (for example, when a password is updated).

[Configuration of Individual Apparatuses]

Next, an internal configuration (processing module) of an individual apparatus included in the data extraction system will be described.

Figure 3:
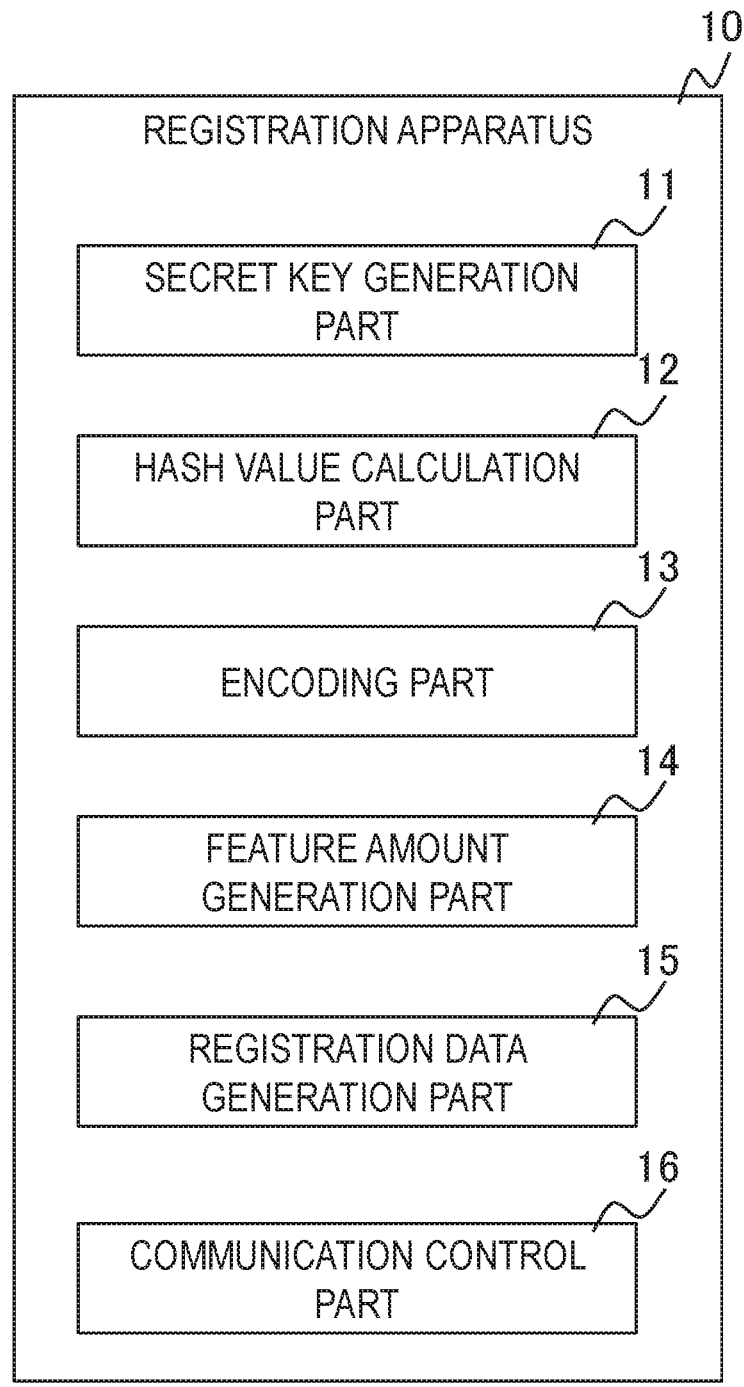
FIG. 3 is a block diagram illustrating an example of an internal configuration of a registration apparatus according to the first exemplary embodiment.

FIG. 3 is a block diagram illustrating an example of an internal configuration of the registration apparatus 10. As illustrated in FIG. 3, the registration apparatus 10 includes a secret key generation part 11, a hash value calculation part 12, an encoding part 13, a feature amount generation part 14, a registration data generation part 15, and a communication control part 16.

The secret key generation part 11 is means for generating a secret key (a key based on secret key cryptography) for keeping (encrypting) secret information secret.

The hash value calculation part 12 is means for calculating a hash value of a secret information identifier corresponding to the secret information.

The encoding part 13 is means for encoding the above generated secret key.

The feature amount generation part 14 is means for generating a feature amount that characterizes biological information entered by the user. For example, when the biological information entered by the user is a fingerprint image, the feature amount generation part 14 generates a feature amount vector using coordinate positions of feature points extracted from the fingerprint image (end points, branch points) as elements and quantifies the biological information.

The registration data generation part 15 is means for generating registration data to be stored in the data storage apparatus 20. While described in detail below, the registration data generation part 15 encrypts the information (secret information) that the user wishes to keep secret by using the above generated secret key and generates registration data by encrypting the encoded secret key with the feature amount calculated from the biological information. Namely, the registration data generation part 15 generates registration data including first information (encrypted text) obtained by encrypting secret information, which is information that a user wishes to keep secret, by using a secret key and second information obtained by encrypting the secret key by using at least biological information of the user.

The communication control part 16 is means for realizing communication with other apparatuses. The communication control part 16 is also means for sorting messages (packets) received from other apparatuses to various processing module parts or transmitting messages acquired from various processing modules to other apparatuses.

Figure 4:
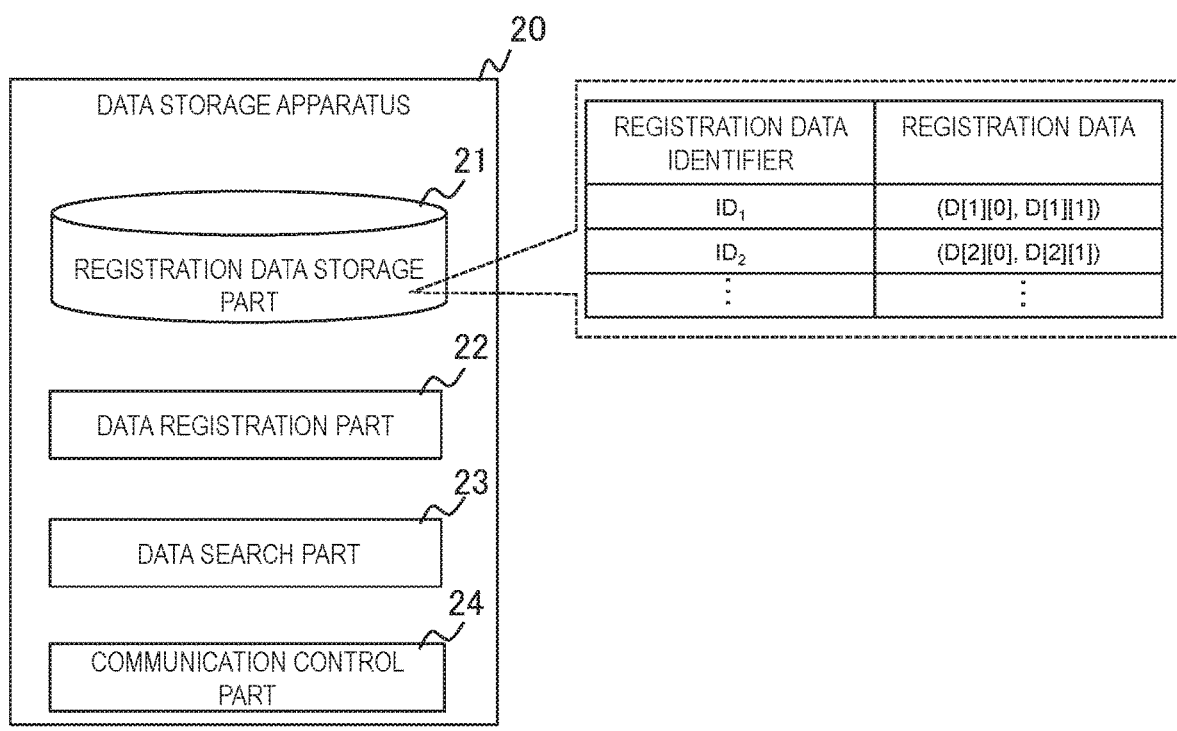
FIG. 4 is a block diagram illustrating an example of an internal configuration of a data storage apparatus according to the first exemplary embodiment.

FIG. 4 is a block diagram illustrating an example of an internal configuration of the data storage apparatus 20. As illustrated in FIG. 4, the data storage apparatus 20 includes a registration data storage part 21, a data registration part 22, a data search part 23, and a communication control part 24.

The registration data storage part 21 is means for holding registration data generated by the registration data generation part 15 in the registration apparatus 10.

The data registration part 22 is means for receiving registration data generated by the registration apparatus 10 and transmitted to the data storage apparatus 20 and storing the data in the registration data storage part 21. In this operation, the data registration part 22 generates an identifier (the above registration data identifier) for identifying the registration data and stores the identifier in the registration data storage part 21 along with the acquired registration data. In addition, the data registration part 22 transmits the generated registration data identifier to the correspondence table storage apparatus 30.

The data search part 23 is means for searching the registration data storage part 21 for registration data requested by the query apparatus 40. The data search part 23 transmits the retrieved registration data to the query apparatus 40.

The communication control part 24 is means for realizing communication with other apparatuses. The communication control part 24 is also means for sorting messages (packets) received from other apparatuses to various processing module parts or transmitting messages acquired from various processing modules to other apparatuses.

Figure 5:
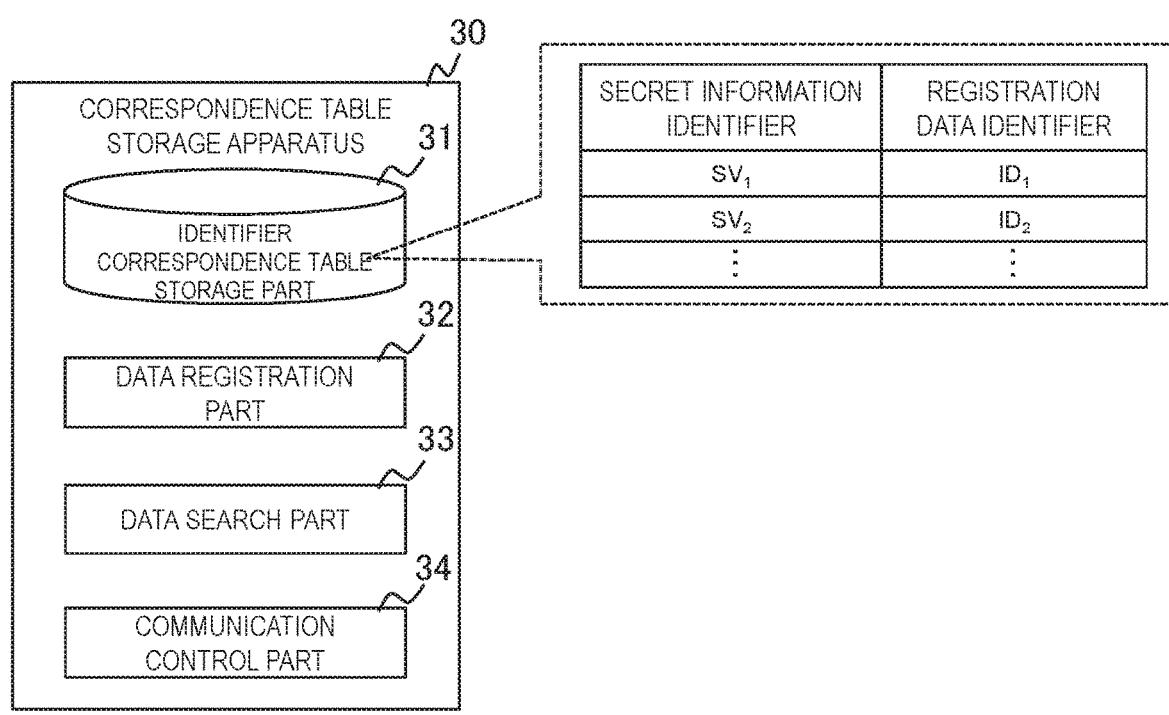
FIG. 5 is a block diagram illustrating an example of an internal configuration of a correspondence table storage apparatus according to the first exemplary embodiment.

FIG. 5 is a block diagram illustrating an example of an internal configuration of the correspondence table storage apparatus 30. As illustrated in FIG. 5, the correspondence table storage apparatus 30 includes an identifier correspondence table storage part 31, a data registration part 32, a data search part 33, and a communication control part 34.

The identifier correspondence table storage part 31 is means for storing a correspondence relationship (a correspondence table, table information) between an individual registration data identifier (an individual identifier added per registration data by the data storage apparatus 20) and an individual secret information identifier (an individual identifier added per secret information by the user).

The data registration part 32 is means for associating an individual secret information identifier acquired from the registration apparatus 10 with an individual registration data identifier acquired from the data storage apparatus 20 and storing the associated identifiers in the identifier correspondence table storage part 31.

The data search part 33 is means for searching for a registration data identifier corresponding to a secret information identifier acquired from the query apparatus 40. The data search part 33 transmits the retrieved registration data identifier to the query apparatus 40.

The communication control part 34 is means for realizing communication with other apparatuses. The communication control part 34 is also means for sorting messages (packets) received from other apparatuses to various processing module parts or transmitting messages acquired from various processing modules to other apparatuses.

Figure 6:
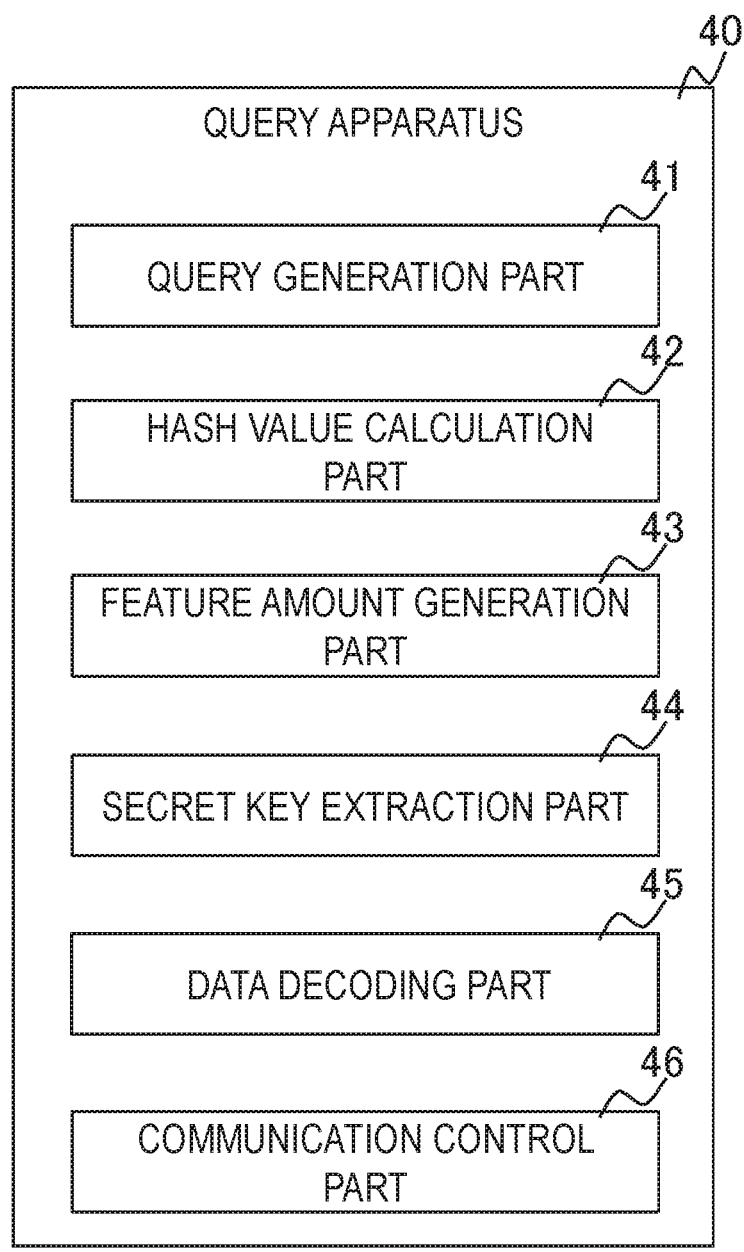
FIG. 6 is a block diagram illustrating an example of an internal configuration of a query apparatus according to the first exemplary embodiment.

FIG. 6 is a block diagram illustrating an example of an internal configuration of the query apparatus 40. As illustrated in FIG. 6, the query apparatus 40 includes a query generation part 41, a hash value calculation part 42, a feature amount generation part 43, a secret key extraction part 44, a data decoding part 45, and a communication control part 46.

The query generation part 41 is means for acquiring, when receiving input of a secret information identifier from a user, a registration data identifier corresponding to the secret information identifier that the user wishes to extract from the correspondence table storage apparatus 30 and generating a query. More specifically, the query generation part 41 generates a query (a registration data transmission request) including the registration data identifier acquired from the correspondence table storage apparatus 30 and transmits the query to the data storage apparatus 20.

The hash value calculation part 42 is means for calculating a hash value for the secret information identifier.

The feature amount generation part 43 is means for generating a feature amount that characterizes biological information entered by the user. The feature amount generation part 43 is means corresponding to the feature amount generation part 14 in the registration apparatus 10 and quantifies the entered biological information by using the same kind of method or algorithm as that used by the feature amount generation part 14. As a result, if the biological information entered to the registration apparatus 10 and the biological information entered to the query apparatus 40 are approximately the same, approximately the same feature amount (a numerical value, a numerical value sequence) can be obtained.

The secret key extraction part 44 is means for extracting a secret key from the registration data transmitted from the data storage apparatus 20 as a result of a query. Details about an operation of the secret key extraction part 44 will be described below.

The data decoding part 45 is means for extracting secret information by decoding encrypted text with an extracted secret key. Details about an operation of the data decoding part will be described below.

The communication control part 46 is means for realizing communication with other apparatuses. The communication control part 46 is also means for sorting messages (packets) received from other apparatuses to various processing module parts or transmitting messages acquired from various processing modules to other apparatuses.

Figure 7:
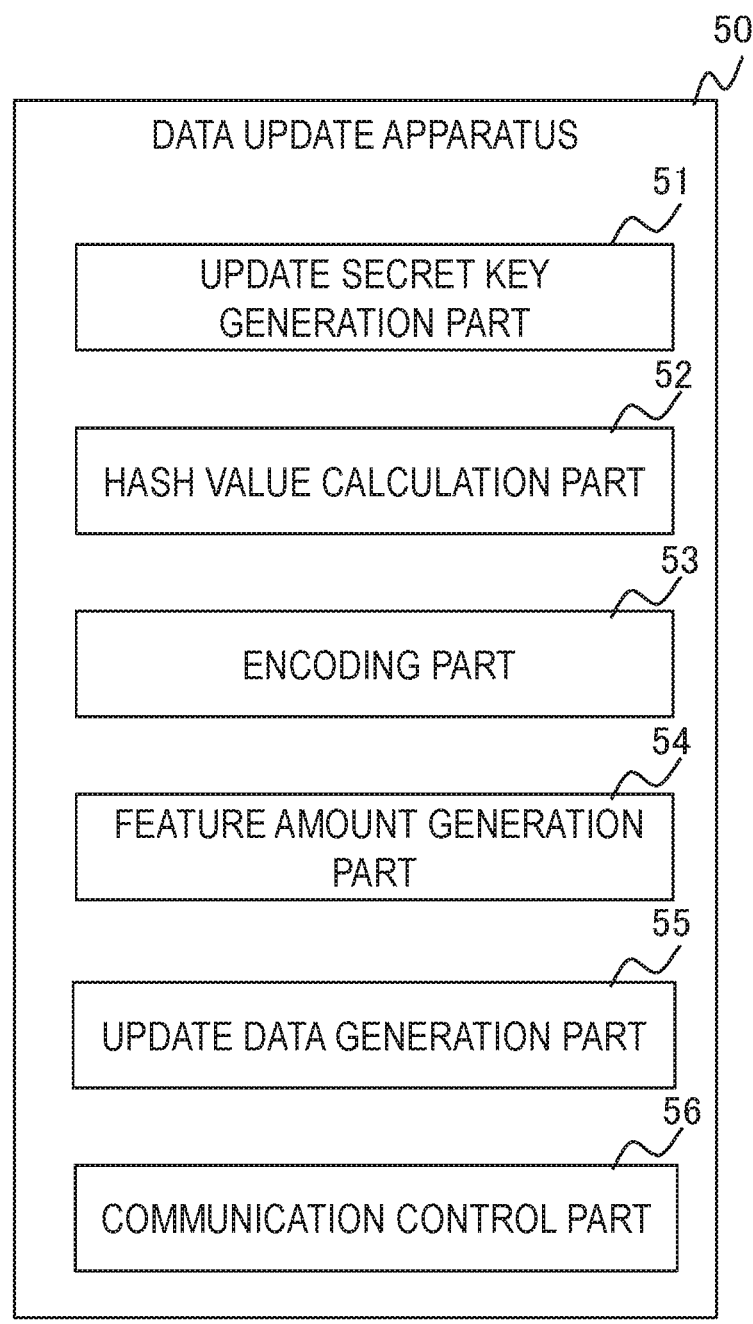
FIG. 7 is a block diagram illustrating an example of an internal configuration of a data update apparatus according to the first exemplary embodiment.

FIG. 7 is a block diagram illustrating an example of an internal configuration of the data update apparatus 50. As illustrated in FIG. 7, the data update apparatus 50 includes an update secret key generation part 51, a hash value calculation part 52, an encoding part 53, a feature amount generation part 54, an update data generation part 55, and a communication control part 56.

The update secret key generation part 51 is means for generating a secret key for keeping updated secret information secret.

The hash value calculation part 52 is means for calculating a hash value of a secret information identifier.

The encoding part 53 is means for encoding the secret key generated by the update secret key generation part 51.

The feature amount generation part 54 is means for generating a feature amount of biological information acquired from a user.

The update data generation part 55 is means for generating updated data (updated registration data) based on the updated secret information. The update data generation part 55 generates data for updating already registered registration data by updating the above first information by encrypting the updated secret information with the update secret key and by updating the above second information with the update secret key.

The communication control part 56 is means for realizing communication with other apparatuses. The communication control part 56 is also means for sorting messages (packets) received from other apparatuses to various processing module parts or transmitting messages acquired from various processing modules to other apparatuses.

The registration apparatus 10 and the data update apparatus 50 differ in that the registration apparatus 10 generates registration data to be initially stored in the data storage apparatus 20 and the data update apparatus 50 generates updated data for updating registration data already stored in the data storage apparatus 20. In other words, since both of the apparatuses share many functions, functions of the data update apparatus 50 may of course be realized by the registration apparatus 10.

[Hardware Configuration]

Next, a hardware configuration of various kinds of apparatuses included in the data extraction system according to the first exemplary embodiment will be described.

Figure 8:
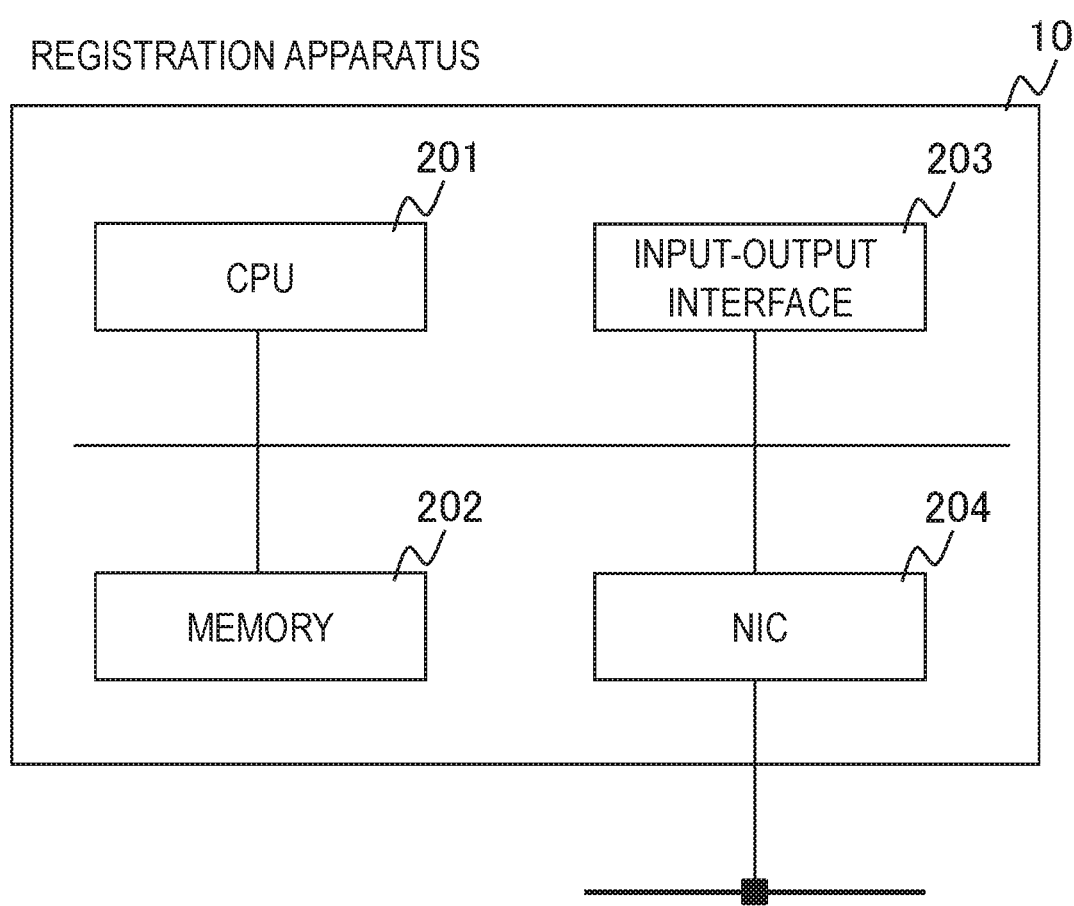
FIG. 8 is a block diagram illustrating an example of a hardware configuration of the registration apparatus according to the first exemplary embodiment.

FIG. 8 is a block diagram illustrating an example of a hardware configuration of the registration apparatus 10 according to the first exemplary embodiment.

The registration apparatus 10 can be configured by an information processing apparatus (computer) and has a configuration illustrated in FIG. 8. For example, the registration apparatus 10 includes a central processing unit (CPU) 201, a memory 202, an input-output interface 203, and a network interface card (NIC) 204 as communication means. These elements are connected to each other via an internal bus.

The hardware configuration of the registration apparatus 10 is not limited to the configuration illustrated in FIG. 8. The registration apparatus 10 may include hardware not illustrated in FIG. 8 or may be configured without input-output interface 203 if appropriate. In addition, the number of CPUs or the like included in the registration apparatus 10 is not limited to the example illustrated in FIG. 8. For example, a plurality of CPUs may be included in the registration apparatus 10.

The memory 202 is a random access memory (RAM), a read-only memory (ROM), or an auxiliary storage device (a hard disk or the like).

The input-output interface 203 is means serving as an interface for a display apparatus or an input apparatus not illustrated. The display apparatus is, for example, a liquid crystal display. The input apparatus is, for example, an apparatus that receives user operations such as a keyboard or a mouse or an apparatus that receives information from an external storage device such as a universal serial bus (USB) memory. Examples of the input apparatus include devices such as a scanner and a microphone. The user enters secret information or a secret information identifier to the registration apparatus 10 by using a keyboard, a mouse, or the like. In addition, the user enters biological information to the registration apparatus 10 by using a scanner or the like.

Functions of the registration apparatus 10 are realized by the above processing modules. For example, an individual one of the processing modules is realized by causing the CPU 201 to execute a program stored in the memory 202. In addition, the program can be updated by downloading an updated program via a network or by using a storage medium in which an updated program is stored. An individual one of the above processing modules may be realized by a semiconductor chip. Namely, it is only necessary to have means for executing the functions of the above processing modules by using some hardware and/or software.

As in the registration apparatus 10, an individual one of the data storage apparatus 20, the correspondence table storage apparatus 30, the query apparatus 40, and the data update apparatus 50 can also be configured by an information processing apparatus. Since an individual one of these apparatuses has the same basic hardware configuration as that of the registration apparatus 10, description thereof will be omitted. However, as in the registration apparatus 10, the query apparatus 40 and the data update apparatus 50 need to be configured to receive input of information from a user (input of secret information, a secret information identifier, and biological information).

Next, prior to description of an operation in the data extraction system, various techniques (secret key cryptography, error-correcting code, biometric authentication) used in the data extraction system will briefly be described.

The secret key cryptography includes three algorithms of KeyGen, Encrypt, and Decrypt. KeyGen is an algorithm that receives a security parameter $1^{\wedge}k$ and generates a secret key SK. Encrypt is an algorithm that receives the secret key SK and a message M and generates an encrypted text Encrypt (SK, M). Decrypt is an algorithm that receives the secret key SK and an encrypted text C and generates a message Decrypt (SK, C).

Decrypt (SK, Encrypt (SK, M))=M is satisfied. The secret key cryptography can mathematically prove that, even when an entity that does not know the secret key SK obtains the encrypted text Encrypt (SK, M), the entity cannot obtain information about the message M at all.

The error-correcting code includes two algorithms of Encode and Decode. Encode is an algorithm that receives a message M and generates coded data Encode (M). Decode is an algorithm that receives code data C and generates a message Decode (C). In this operation, when a distance d1 (C, Encode (M)) between the code data C and the code data Encode (M) of a certain message M is less than a predetermined value t1, namely, when the distance d1 (C, Encode (M))<t1, Decode (C)=M is established.

The definition of the distance is determined by the error-correcting code. For example, when the error-correcting code is a BCH code, the distance is the Hamming distance. When the error-correcting code is a Reed-Solomon code, the distance is the Euclidean distance.

The biometric authentication is a technique for performing user authentication by using biological information such as a fingerprint, a vein, or a face. As is commonly known, each time biological information is obtained, different biological information is obtained. However, biological information Z1 and biological information Z2 acquired from the same biological body are close to each other in terms of some distance (the biological information Z1 is approximately equal to the biological information Z2). In the biometric authentication, checking is performed by using the similarity under this distance. Namely, a distance d2 (Z1, Z2) between the biological information Z1 and Z2 acquired from the same biological body can be assumed to be less than a threshold t2, and a distance d3 (Z1, Z3) between the biological information Z1 and biological information Z3 acquired from different biological bodies can be assumed to be equal to or more than the threshold t2.

Hereinafter, the above three phases (the registration phase, the query phase, and the update phase) will be described in detail.

In the following description of the three phases, a binary operator (+) is used. For example, the binary operator (+) is an exclusive OR or addition per bit and is an operator determined depending on the kind of error-correcting code used in the system. For example, when a BCH code is used as the error-correcting code, the binary operator (+) is an exclusive OR per bit.

[Registration Phase]

Figure 9:
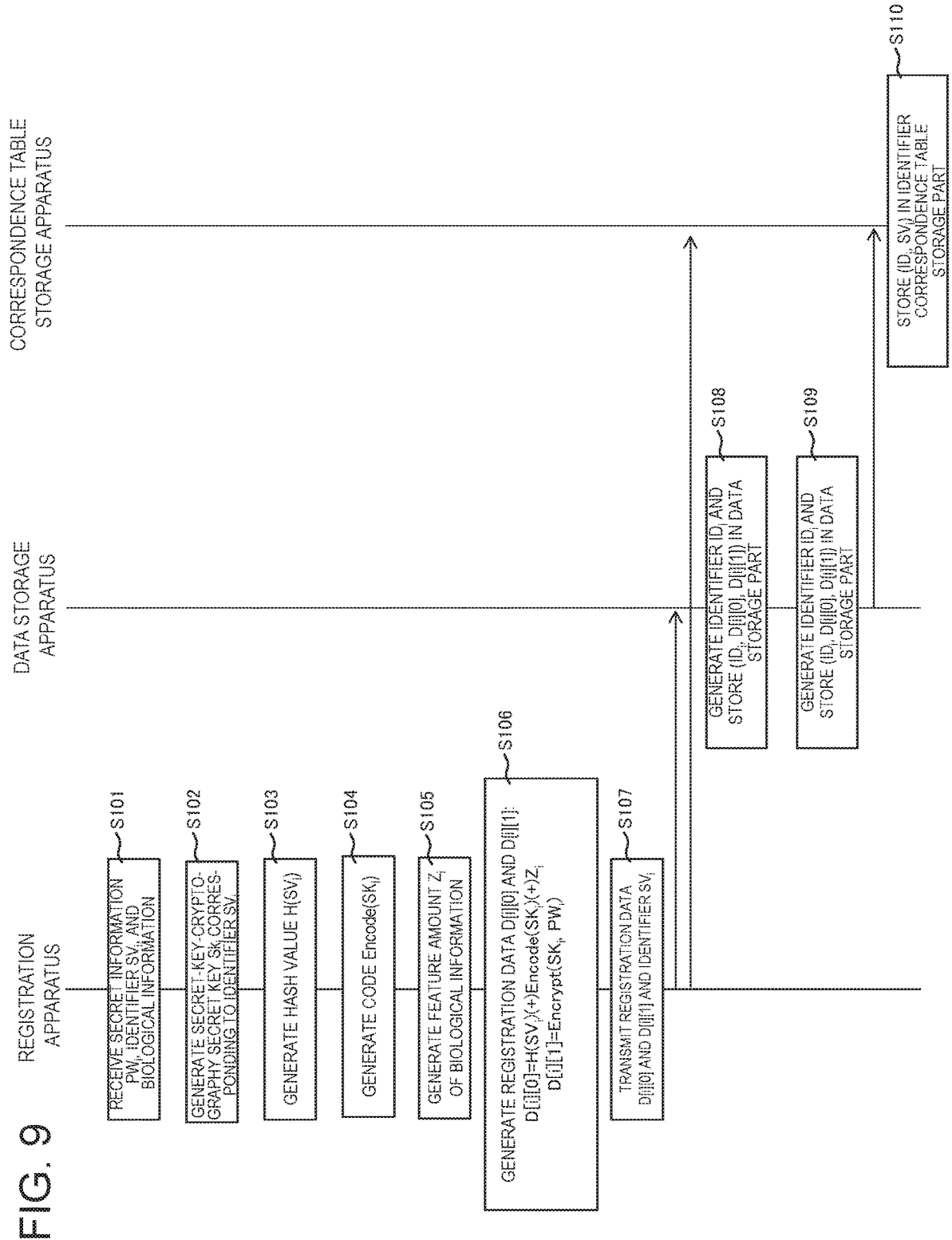
FIG. 9 is a sequence diagram illustrating an example of an operation in a registration phase in the data extraction system according to the first exemplary embodiment.

FIG. 9 is a sequence diagram illustrating an example of an operation in the registration phase in the data extraction system according to the first exemplary embodiment.

The registration apparatus 10 receives secret information $PW_i$ that a user i (i is a positive integer, and the same holds true for the following description) wishes to store in the system, a corresponding secret information identifier SVi, and biological information (step S101).

The secret key generation part 11 in the registration apparatus 10 generates a secret-key-cryptography secret key $SK_i$ corresponding to the secret information identifier $SV_i$ (step S102).

The hash value calculation part 12 receives the secret information identifier $SV_i$ and generates a hash value H ($SV_i$) (step S103).

The encoding part 13 encodes the generated secret key $SK_i$ by using the error-correcting code, to generate Encode ($SK_i$) (step S104).

The feature amount generation part 14 generates a corresponding feature amount $Z_i$ from the biological information of the user (step S105).

The registration data generation part 15 generates registration data D[i][0] and D[i][1] in accordance with the following two formulas (step S106).

$$D[i][0]=H(SV_i)(+)Encode(SK_i)(+)Z_i \quad (1)$$

$$D[i][1]=Encrypt(SK_i, PW_i) \quad (2)$$

The registration data generation part 15 transmits the generated registration data (D[i][0] and D[i][1]) to the data storage apparatus 20 and transmits the identifier $SV_i$ to the correspondence table storage apparatus 30 (step S107).

After receiving the registration data (D[i][0], D[i][1]), the data registration part 22 in the data storage apparatus 20 generates a registration data identifier $ID_i$ corresponding to the received registration data and stores the combination of the registration data and the corresponding identifier ($ID_i$, D[i][0], and D[i][1]) in the registration data storage part 21 (step S108).

Next, the data storage apparatus 20 transmits the registration data identifier $ID_i$ to the correspondence table storage apparatus 30 (step S109).

After receiving the secret information identifier $SV_i$ from the registration apparatus 10 and the registration data identifier $ID_i$ from the data storage apparatus 20, the correspondence table storage apparatus 30 stores the correspondence relationship between these identifiers ($ID_i$ and $SV_i$) in the identifier correspondence table storage part 31 (step S110).

[Query Phase]

Figure 10:
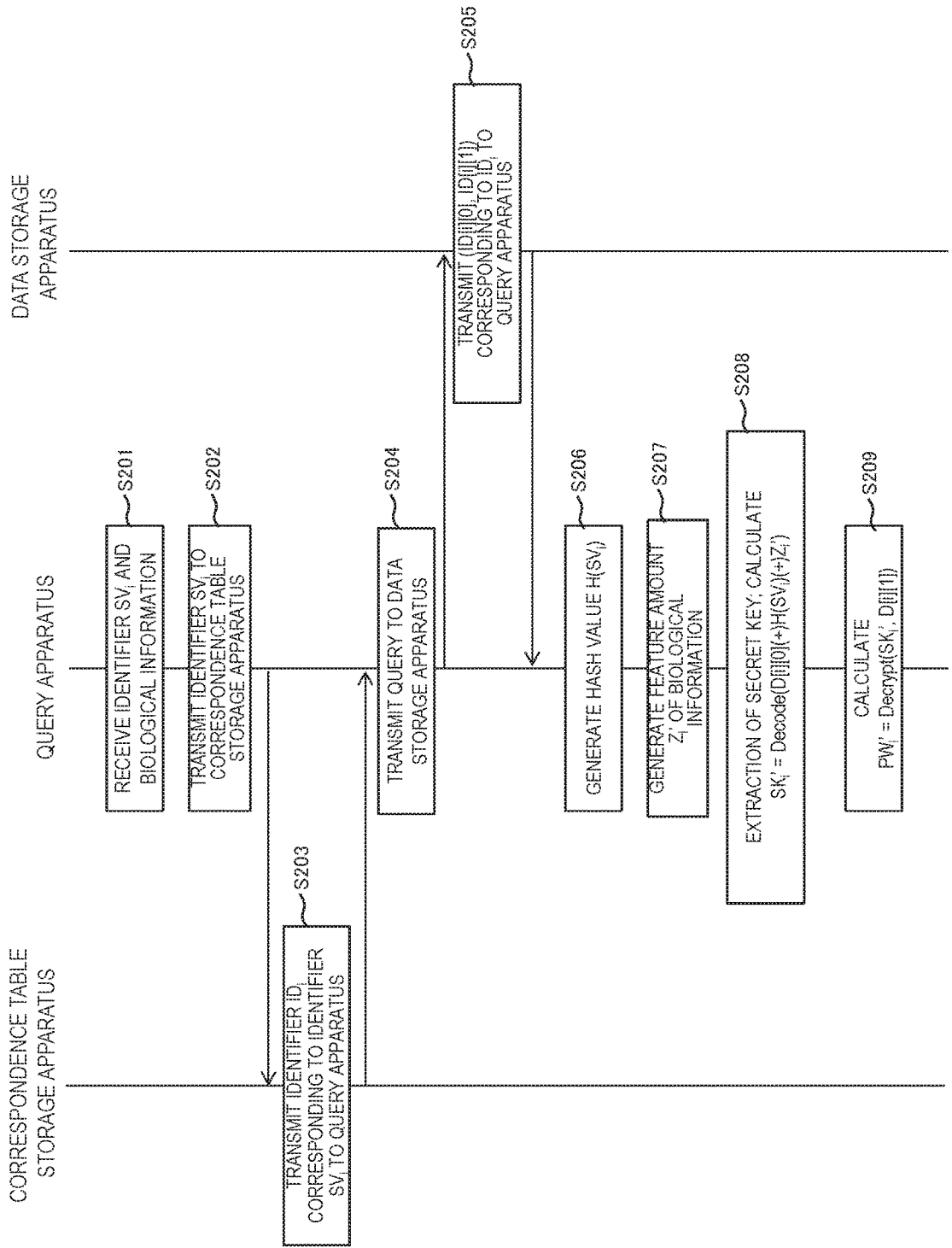
FIG. 10 is a sequence diagram illustrating an example of an operation in a query phase in the data extraction system according to the first exemplary embodiment.

FIG. 10 is a sequence diagram illustrating an example of an operation in the query phase in the data extraction system according to the first exemplary embodiment.

The query apparatus 40 receives a secret information identifier $SV_i$ corresponding to secret information that the user i wishes to extract and biological information from the user i (step S201).

The query apparatus 40 transmits the acquired secret information identifier $SV_i$ to the correspondence table storage apparatus 30 (step S202).

After receiving the secret information identifier $SV_i$, the data search part 33 in the correspondence table storage apparatus 30 searches the identifier correspondence table storage part 31 and determines a registration data identifier $ID_i$ corresponding to the secret information identifier $SV_i$. Next, the data search part 33 transmits the registration data identifier $ID_i$ corresponding to the secret information identifier $SV_i$ to the query apparatus 40 (step S203).

The query apparatus 40 generates a query based on the registration data identifier $ID_i$ and transmits the generated query to the data storage apparatus 20 (step S204).

After receiving the query including the registration data identifier $ID_i$, the data search part 23 in the data storage apparatus 20 determines the registration data (ID[i][0] and ID[i][1]) corresponding to the registration data identifier $ID_i$ and transmits the registration data to the query apparatus 40 (step S205).

After receiving the registration data (ID[i][0], ID[i][1]), the query apparatus 40 causes the hash value calculation part 42 to generate a hash value H ($SV_i$) of the secret information identifier $SV_i$ (step S206).

The feature amount generation part 43 generates a corresponding feature amount $Z_i'$ from the biological information of the user (step S207).

The secret key extraction part 44 generates a secret key $SK_i'$ in accordance with the following formula (3) by using the feature amount $Z_i'$ generated from the biological information of the user (step S208).

$$SK_i'=Decode(D[i][0](+)H(SV_i)(+)Z_i') \quad (3)$$

Next, the data decoding part 45 restores the secret information $PW_i'$ in accordance with the following formula (4) by using the secret key $SK_i'$ (step S209).

$$PW_i'=Decrypt(SK_i', D[i][1]) \quad (4)$$

When the secret information $PW_i'$ restored by the query apparatus 40 is provided to the user, the query phase is ended.

[Update Phase]

FIG. 11 is a sequence diagram illustrating an example of an operation in the update phase in the data extraction system according to the first exemplary embodiment.

A user who wishes to update (change) secret information enters updated secret information $uPW_i$ and a corresponding secret information identifier $SV_i$ to the data update apparatus 50 (step S301).

The data update apparatus 50 transmits the secret information identifier $SV_i$ to the correspondence table storage apparatus 30 (step S302).

After receiving the secret information identifier $SV_i$, the correspondence table storage apparatus 30 determines a registration data identifier $ID_i$ corresponding to the secret information identifier $SV_i$ and transmits the identifier $ID_i$ to the data update apparatus 50 (step S303).

The update secret key generation part 51 in the data update apparatus 50 generates a data-update secret key $uSK_i$ (step S304).

The hash value calculation part 52 generates a hash value $H(SV_i)$ of the identifier $SV_i$ (step S305).

The encoding part 53 generates a code Encode $(uSK_i)$ of the update secret key $uSK_i$ (step S306).

The feature amount generation part 54 generates a corresponding feature amount $Z_i''$ from the biological information of the user (step S307).

The update data generation part 55 generates updated registration data $uD[i][0]$ and $uD[i][1]$ in accordance with the following formulas (5) and (6) by using the updated secret information $uPW_i$ and the feature amount $Z_i''$ of the biological information (step S308).

$$uD[i][0]=H(SV_i)(+)\text{Encode}(uSK_i)(+)Z_i'' \quad (5)$$

$$uD[i][1]=\text{Encrypt}(uSK_i,uPW_i) \quad (6)$$

The update data generation part 55 transmits the registration data identifier $ID_i$ and the updated registration data ($uD[i][0]$ and $uD[i][1]$) to the data storage apparatus 20 (step S309).

After receiving the registration data identifier $ID_i$ and the updated registration data ($uD[i][0]$ and $uD[i][1]$), the data storage apparatus 20 updates the corresponding registration data (old registration data) with the updated data ($ID_i$, $uD[i][0]$, and $uD[i][1]$) (step S310). Through the above processing, the registration data in the data storage apparatus 20 is updated.

As described above, in the data extraction system according to the first exemplary embodiment, data (secret information; for example, a combination of a password and a service) that a user wishes to store in the data storage apparatus 20 is encrypted by secret key cryptography. In this operation, the secret key used by the encryption is encrypted by biological information unique to the user. Consequently, the user can extract the data that the user wishes to store in the system (the data that the user wishes to extract from the system) from a server apparatus (the data storage apparatus 20) on a cloud or the like when necessary while keeping the data secret from the server apparatus. Namely, according to the first exemplary embodiment, the user can keep biological information and secret information secret from a cloud manager, etc., without holding particular information (secret information other than the biological information). In addition, the user can extract the target information when necessary by using his/her own biological information.

The data extraction system described in the first exemplary embodiment can be realized by using, for example, a BCH code as the error-correcting code and the Advanced Encryption Standard (AES), as the secret key cryptography. In this case, the binary operator (+) is an exclusive OR per bit. Other error-correcting codes (a Reed-Solomon code, etc.) and other secret key cryptography may of course be used.

Even when biological information is acquired from the same person, a different feature amount could be obtained, depending on the condition under which the biological information is acquired (for example, in the case of a fingerprint image, the pressing force of the finger). According to the first exemplary embodiment, when a secret key is made secret (encrypted), biological information Z (more accurately, a corresponding feature amount) is caused to act on a secret key encoded by the error-correcting code (a binary operation is performed). Thus, even when there is a slight difference between the biological information Z and biological information Z' used when the error-correcting code is decoded, the function of the error-correcting code corrects (absorbs) this difference. However, when the biological information Z used to encrypt a secret key and the biological information Z' used to decode the error-correcting code are obtained by different persons, the function of the error-correcting code cannot correct (absorb) this difference, and the secret key cannot be extracted correctly. Thus, even when a person who is different from the person who entered a secret information identifier enters biological information to the query apparatus 40, the different person cannot acquire the corresponding secret key from the information. However, there are cases in which the difference allowed by the error-correcting code is narrow (cases in which fingerprints of the same person are often determined to be those of different persons), depending on the environment or the like in which biological information is acquired. In such cases, for example, when the fingerprint images are used as biological information, coordinates of the feature points may be set coarsely. In this way, the error-correcting code can absorb the above difference.

In addition, in the above exemplary embodiment, when a user extracts an encrypted secret key, the user needs to enter an identifier (a secret information identifier) added to the corresponding secret information, in addition of biological information of the user. Thus, even when a different person somehow obtains the biological information of the above user, unless the different person obtains the secret information identifier, the different person cannot extract the encrypted secret key. In addition, the functions of the data storage on the cloud side are separated by the data storage apparatus 20 and the correspondence table storage apparatus 30. Namely, since the data storage apparatus 20 stores the registration data, and the correspondence table storage apparatus 30 stores the correspondence table of the secret information identifiers and the registration data identifiers, even when any one of the data is leaked, the confidentiality of the encrypted information (secret information, secret key) is ensured. In this point of view, too, the data extraction system according to the first exemplary embodiment can ensure high security.

While the industrial applicability of the present invention is apparent from the above description, for example, the present invention is suitably applicable to a password manager. In particular, for example, the present invention is suitably applicable to cases where passwords used for various services are stored in a storage located on a network such as on a cloud. By using the present invention, the user can keep his/her own passwords used for various services secret from a storage on a network, and the user can extract the passwords by using his/her own biological information. In this case, for example, the user can obtain desired data from various devices by using his/her own biological information, without holding any decoding key.

The configuration (FIG. 2) of the data extraction system according to the above exemplary embodiment is only an example, which is not intended to limit the configuration of the system. For example, the functions of the data storage apparatus 20 and the correspondence table storage apparatus 30 may be realized by a single apparatus.

The above exemplary embodiment can partially or entirely be described, but not limited to, as follows.

[Mode 1]

See the data extraction system according to the above first aspect.

[Mode 2]

The data extraction system according to at least mode 1; wherein the registration apparatus is configured to generate the second information by using at least a result obtained by encoding the secret key and the biological information of the user.

[Mode 3]

The data extraction system according to at least mode 2; wherein the registration apparatus is configured to calculate a hash value of a first identifier for identifying the secret information and generate the second information by using the hash value of the first identifier and a binary operation of the result obtained by encoding the secret key and the biological information of the user.

[Mode 4]

The data extraction system according to at least mode 3; further comprising:

a correspondence table storage apparatus configured to hold a correspondence between the first identifier and a second identifier for identifying the registration data;

wherein the registration apparatus transmits the first identifier to the correspondence table storage apparatus; and wherein the data storage apparatus is configured to generate the second identifier when storing the registration data and transmit the generated second identifier to the correspondence table storage apparatus.

[Mode 5]

The data extraction system according to any one of at least modes 1 to 4, further comprising:

a data update apparatus configured to generate data for updating the registration data by updating the first information by encrypting updated secret information by using an update secret key and by updating the second information by using the update secret key.

[Mode 6]

The data extraction system according to any one of at least modes 1 to5; wherein the secret key is a key based on secret key cryptography.

[Mode 7]

The data extraction system according to any one of at least modes 2 to 4; wherein the secret key is encoded by a BCH code method.

[Mode 8]

See the data extraction method according to the above second aspect.

[Mode 9]

See the registration apparatus according to the above third aspect.

[Mode 10]

See the program according to the above fourth aspect. Modes 8 to 10 can be expanded in the same way as mode 1 is expanded to modes 2 to 7.

The disclosure of the above PTL is incorporated herein by reference thereto. Variations and adjustments of the exemplary embodiment and examples are possible within the scope of the disclosure (including the claims) of the present invention and based on the basic technical concept of the present invention. Various combinations and selections of various disclosed elements (including the elements in the claims, exemplary embodiment, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 10, 101 registration apparatus
11 secret key generation part
12, 42, 52 hash value calculation part
13, 53 encoding part
14, 43, 54 feature amount generation part
15 registration data generation part
16, 24, 34, 46, 56 communication control part
20, 102 data storage apparatus
21 registration data storage part
22, 32 data registration part
23, 33 data search part
30 correspondence table storage apparatus
31 identifier correspondence table storage part
40, 103 query apparatus
41 query generation part
44 secret key extraction part
45 data decoding part
50 data update apparatus
51 update secret key generation part
55 update data generation part
201 central processing unit (CPU)
202 memory
203 input-output interface
204 network interface card (NIC)

What is claimed is:

1. A data extraction system, comprising:

a registration apparatus, comprising a processor; and a memory in circuit communication with the processor, wherein the processor is configured to execute program instruction stored in the memory to:

generate registration data including first information obtained by encrypting secret information, which is information that a user wishes to keep secret, by using a secret key and second information obtained by encrypting the secret key by using at least biological information of the user;

a data storage apparatus, comprising a processor; and a memory in circuit communication with the processor, wherein the processor is configured to execute program instruction stored in the memory to: hold the registration data; and a query apparatus, comprising a processor; and a memory in circuit communication with the processor, wherein the processor is configured to execute program instruction stored in the memory to: acquire the registration data by generating a query for acquiring the registration data from the data storage apparatus, extract the secret key from the registration data by using biological information of the user, and extract the secret information from the registration data by using the extracted secret key, wherein the registration apparatus is configured to generate the second information by using at least a result obtained by encoding the secret key and the biological information of the user, and wherein the registration apparatus is configured to calculate a hash value of a first identifier for identifying the secret information and generate the second information by using the hash value of the first identifier and a binary operation of the result obtained by encoding the secret key and the biological information of the user.

2. The data extraction system according to claim 1; further comprising:
a correspondence table storage apparatus, comprising a processor; and
a memory in circuit communication with the processor, wherein
the processor is configured to execute program instruction stored in the memory to: hold a correspondence between the first identifier and a second identifier for identifying the registration data;
wherein the registration apparatus transmits the first identifier to the correspondence table storage apparatus; and
wherein the data storage apparatus is configured to generate the second identifier when storing the registration data and transmit the generated second identifier to the correspondence table storage apparatus.

3. The data extraction system according to claim 1, further comprising:
a data update apparatus, comprising a processor; and
a memory in circuit communication with the processor, wherein
the processor is configured to execute program instruction stored in the memory to: generate data for updating the registration data by updating the first information by encrypting updated secret information by using an update secret key and by updating the second information by using the update secret key.

4. The data extraction system according to claim 1; wherein the secret key is a key based on secret key cryptography.

5. The data extraction system according to claim 1; wherein the secret key is encoded by a BCH code method.

6. A data extraction method, comprising:
generating registration data including first information obtained by encrypting secret information, which is information that a user wishes to keep secret, by using a secret key and second information obtained by encrypting the secret key by using at least biological information of the user;
storing the registration data in a data storage apparatus;
acquiring the registration data by generating a query for acquiring the registration data from the data storage apparatus;
extracting the secret key from the registration data by using biological information of the user; and
extracting the secret information from the registration data by using the extracted secret key;
wherein the generating comprises generating the second information by using at least a result obtained by encoding the secret key and the biological information of the user, and
wherein the method further comprises calculating a hash value of a first identifier for identifying the secret information and generating the second information by using the hash value of the first identifier and a binary operation of the result obtained by encoding the secret key and the biological information of the user.

7. A non-transitory computer-readable recording medium storing a program, causing a computer to perform processing for:
generating a secret key for encrypting secret information, which is information that a user wishes to keep secret; and
generating registration data including first information obtained by encrypting the secret information by using the secret key and second information obtained by encrypting the secret key by using at least biological information of the user;
wherein the generating comprises generating the second information by using at least a result obtained by encoding the secret key and the biological information of the user, and
wherein the processing is further for calculating a hash value of a first identifier for identifying the secret information and generating the second information by using the hash value of the first identifier and a binary operation of the result obtained by encoding the secret key and the biological information of the user.

* * * * *